United States Patent [19]

Cline

[11] 4,237,514
[45] Dec. 2, 1980

[54] LIGHTNING DIVERTER STRIP

[75] Inventor: Jay D. Cline, Fort Lauderdale, Fla.

[73] Assignee: Dayton-Granger, Inc., Fort Lauderdale, Fla.

[21] Appl. No.: 965,605

[22] Filed: Dec. 1, 1978

Related U.S. Application Data

[63] Continuation of Ser. No. 823,025, Aug. 9, 1977, abandoned.

[51] Int. Cl.³ .............................................. H02H 3/22
[52] U.S. Cl. ................................. 361/117; 361/218; 361/220
[58] Field of Search ................... 361/117, 1, 218, 220, 361/222, 216, 217, 212

[56] References Cited

U.S. PATENT DOCUMENTS

| | | | |
|---|---|---|---|
| 2,466,311 | 4/1949 | Hall | 361/218 |
| 2,982,494 | 5/1961 | Amason | 361/117 X |
| 3,121,825 | 2/1964 | Abegg et al. | 361/220 X |
| 3,416,027 | 12/1968 | Amason et al. | 361/117 X |
| 3,440,091 | 4/1969 | Delmore | 361/220 X |
| 3,617,805 | 11/1971 | Truax | 361/222 |

FOREIGN PATENT DOCUMENTS 2264660 10/1975 France.

OTHER PUBLICATIONS

"Aircraft Protection from Thunderstorm Electro-Magnetic Effects" by Newnan, Robb and Stahmann; May 1963, Technical Document Report ASD-TDR-62-438, Part V. Bureau of Naval Weapons, United States Navy.
"Model LS60-06 Lightning Protection System" Commercial leaflet 2 pages, no date, 361-218.

Primary Examiner—Patrick R. Salce
Attorney, Agent, or Firm—Biebel, French & Nauman

[57] ABSTRACT

A lightning diverter strip for use on aircraft components has a polyester tape base onto which is bonded by an epoxy a coating or layer of uniformly dispersed powdered aluminum.

5 Claims, 4 Drawing Figures

U.S. Patent  Dec. 2, 1980  4,237,514
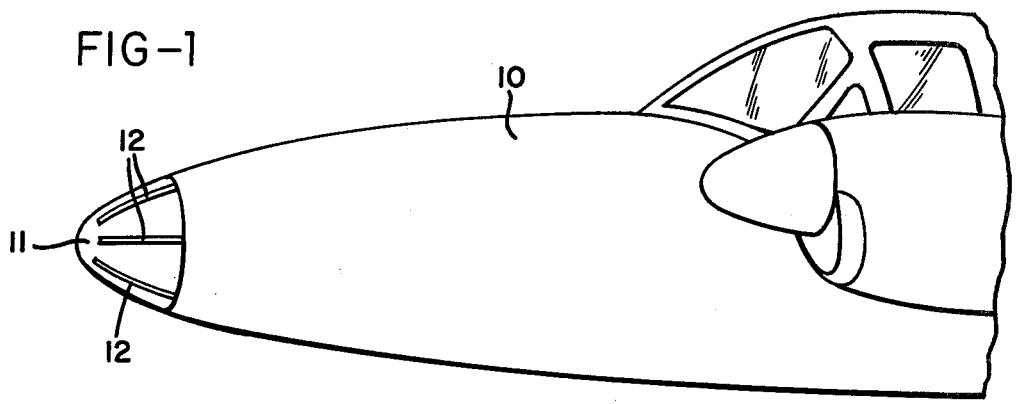
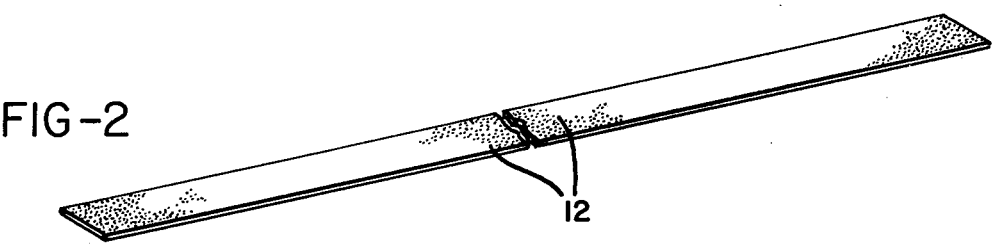
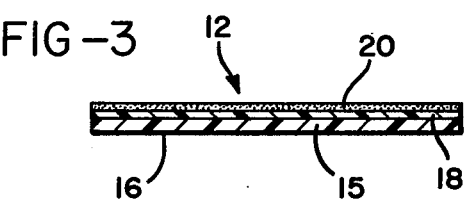
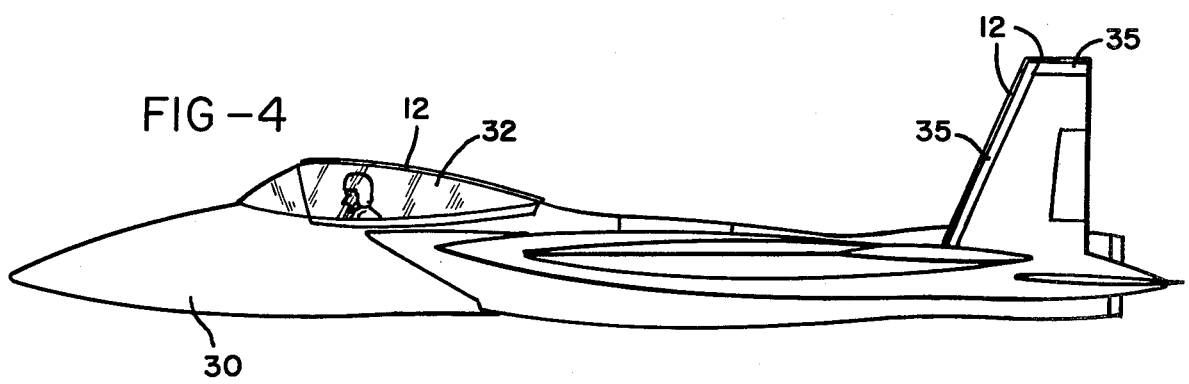

LIGHTNING DIVERTER STRIP

RELATED APPLICATION

This application is a continuation of application Ser. No. 823,025 filed Aug. 9, 1977, now abandoned.

BACKGROUND OF THE INVENTION

This invention relates to aircraft lightning protection and more particularly to an improved lightning diverter strip for aircraft.

It is well known that aircraft, when flying in the vicinity of thunderstorms, are subject to lightning strikes. Various points and regions of the aircraft extremities are subject to the formation of streamers prior to the actual lightning strike. It is also known that the lightning strike will occur when a leader connects up with one of the streamers, and the resulting current can reach as high as 200,000 amperes. While the aluminum aircraft skin is seldom subject to severe lightning damage by reason of its electrical conductivity, lightning attachments at certain critical points, for example, the radome section, are to be avoided due to the likelihood of damage to the electrical equipment.

Lightning diverter strips have been devised in the past for application to aircraft structural surfaces for the purpose of providing a non-destructive, electrically-conducted path to protect the underlying structure from direct lightning attachments. For example, thin metal foil strips and solid metal bars have been used to divert the charge. In addition, a series of closely spaced metal disks or dots have been applied to flexible strip material. In such instances, metal disks of 1/10 inch diameter have been bonded to a substrate, and the latter has been fixed by an epoxy adhesive to the outer surface of the radome to provide an ionized conductive path. While such an arrangement has been successful, it is of relatively high cost, and the relatively large disks absorb a great deal of heat and occasionally these disks have been known to explode and shoot out like pellets, especially if they are spaced too far apart. Also, the size of the disks adversely affect the radio frequency absorption of the strip.

SUMMARY OF THE INVENTION

The present invention is directed to a low-cost non-destructive lightning diverter strip which may readily be applied to radomes and the like. It consists of a light polyester substrate and a uniformly dispersed powdered metal applied to the upper surface thereof and bonded thereto by a suitable flexible epoxy. Finely powdered aluminum is used as the conductor metal and is distributed uniformly along the surface of the substrate, in such a manner that a direct current conductive path is not formed. Thus, the finished strip will have a very high resistance so that it will read essentially as an open circuit to DC voltage. The particles are dispersed in sufficiently close fashion that the strip is essentially a short circuit to lightning currents and is also transparent to rf energy. Since the aluminum particles are of small size, very little energy is absorbed in the particles and physical damage due to lightning attachments is held to a minimum. The particles themselves, since they are very close together, appear to the lightning as a large number of series-connected tiny capacitors which guide the lightning strike to the fuselage.

The supporting film strip or substrate is preferably formed of a thin dielectric plastic of the polyester type, preferably polyethylene terephalate. The strip is conveniently applied to the aircraft surface to be protected by a suitable epoxy cement.

It is accordingly an important object of this invention to provide a low-cost, light-weight lightning diverter strip which is essentially transparent to rf energy. It has low aerodynamic drag, is capable of absorbing repeated lightning strikes, and is easy to apply and maintain.

Another object of the invention is the provision of a lightning diverter strip, as outlined above, including a dispersion of finely divided metal particles bonded to a thin supporting dielectric strip.

Another, and more particular, object of the invention is the provision of the lightning diverter strip in which finely powdered aluminum is finely dispersed along an epoxy binder on a thin dielectric substrate.

Other objects and advantages of the invention will be apparent from the following description, the accompanying drawings and the appended claims.

BRIEF DESCRIPTION OF THE DRAWINGS

FIG. 1 is a perspective view of the nose of the aircraft showing a radome as having diverter strips applied thereto;

FIG. 2 is a perspective view, partially broken away, of a strip according to this invention;

FIG. 3 is a transverse section through the strip; and

FIG. 4 shows the strips as applied to the canopy and vertical stabilizer surfaces of an aircraft.

DESCRIPTION OF PREFERRED EMBODIMENT

Referring to the figures of the drawing which illustrate a preferred embodiment, a typical aircraft is shown at 10 as havig a radome 11 which is to be protected by the lightning diverter strips 12 of this invention. As shown, the strips 12 will commonly lead along the surface of the part to be protected and will terminate at or near the skin of the aircraft.

The strip of this invention is illustrated in FIGS. 1 and 2 as including a base or substrate 15 formed of polyester tape having a lower surface 16 adapted to be applied directly to the aircraft component to be protected and bonded thereto by suitable epoxy. The base 15 is preferably a dielectric material such as thin polyethylene terephalate sold under the tradename Mylar. Preferably, this material is in the range of 4 mils in thickness, although the thickness, width, and length are not critical.

A heat curable flexible epoxy 18 is uniformly applied to the upper surface of the substrate 15.

A conductive metal powder 20 is uniformly deposited along the upper surface of the epoxy 18. The epoxy forms a binder to bind the metal powder to the base 15. While many different conductive metal powders may be used, it is preferable to employ finely divided aluminum. The aluminum particles are deposited sparsely along the binder 18 on the base 15.

Preferably, an atomizer grade powder is used which is 99.5% pure aluminum with a particle size of $13 \pm 3$ microns. The powder is uniformly dispersed along the binder or epoxy 18 with an approximate density of 300,000 particles per square centimeter. The actual density is not critical and may be 100,000 particles per square centimeter, or lower. The individual particles are of such a small physical mass that very little energy is absorbed within the particles. Thus, physical damage to the diverter strip 12 due to lightning attachment is held to a minimum. For the best results, the aluminum particles are deposited sparsely along the binder 18 on the base 15. Preferably, the powdered aluminum particles are deposited on the binder 18 before it is cured and thus become embedded into the exposed surface of the binder. An excess of particles may be deposited on the uncured binder, and the excess particles removed by physically shaking or brushing the strip after curing so that only the attached or embedded particles remain. While the individual aluminum particles may touch each other, nevertheless a DC conductive path is not formed in view of the fact that the aluminum particles have a microscopically thin coating of aluminum oxide on their outer surfaces, and aluminum oxide is essentially a non-conductive or a dielectric material. Therefore, the strip will read, after curing, as an essentially open DC circuit or will present a very high resistance to DC voltage.

While the strip reads as an open circuit to DC voltage, it will be substantially transparent to rf frequencies, and provides a low impedance path at the frequencies of the lightning strike. Since the particles are close together, the strip appears to the lightning as a large series of very small capacitors guiding the strike to the conductive skin of the aircraft.

The finished diverter is very thin, is flexible, and is easy to apply. The tape base 15 may for example be ⅜" wide, and any length. It is easily cut by scissors to a desired length. For the purpose of illustration, the thicknesses shown in FIG. 3 have been greatly exaggerated. Further, the particles 20 are actually slightly embedded within the epoxy forming the binder 18 and are permanently attached to the base 15. The diverter strip 12 has high resistance to errosion and damage due to air currents and the impact of rain on the exposed surface. Since the strip is flexible and thin, it is easy to apply and it is relatively inexpensive to manufacture as compared to prior devices. It does not adversely affect the operation of radar and has low aerodynamic drag. It has little or no maintenance requirements and is capable of taking repeated lightning strikes without severe degradation.

Of course, the strip 12 may be used wherever lightning protection on an aircraft is desired. In FIG. 4, the jet aircraft 30 is shown as having a plastic canopy 32 protected by a strip 12. A vertical stabilizer has fiber glass leading edges 35 which are also protected by strips 12.

While the method herein described, and the form of apparatus for carrying this method into effect constitute preferred embodiments of this invention, it is to be understood that the invention is not limited to this precise method and form of apparatus, and that changes may be made in either without departing from the scope of the invention.

What is claimed is:

1. A lightning diverter strip for conducting lightning-induced electrical currents and thereby protecting vulnerable aircraft components such as radomes and the like, comprising a substrate of flexible dielectric tape having a lower surface adapted to be applied to the aircraft component to be protected thereby, and having an upper surface, a flexible epoxy binder on said upper surface, a conductive metal powder of finely divided aluminum uniformly deposited along said tape and bound thereto by said binder, said powder having a density such as to provide a very high DC resistance which reads essentially as an open circuit to DC voltages while forming a discrete, non-destructive conductive path for electrical currents induced by lightning.

2. The strip of claim 1 in which said aluminum powder is of a particle size of approximately 3 microns in diameter and deposited with a density of not substantially less than 100,000 particles per square centimeter and not substantially in excess of 300,000 particles per square centimeter.

3. The strip of claim 1 in which said tape is formed of polyethylene terephalate.

4. The method of manufacturing a lightning diverter strip comprising the steps of
 (a) providing a length of thin dielectric plastic tape,
 (b) applying a curable epoxy to one surface of the tape,
 (c) uniformly applying finely divided aluminum powder to the epoxy with a density such as to provide a very high DC resistance which reads essentially as an open circuit to DC voltages while forming a discrete, non-destructive conductive path for lightning-induced currents, and
 (d) curing said epoxy to bind the aluminum particles to the tape.

5. The method of claim 4 in which the aluminum powder has a particle size of approximately 13 microns and is deposited with a density which is not substantially less than 100,000 particles per square centimeter.

* * * * *